Figure 1:
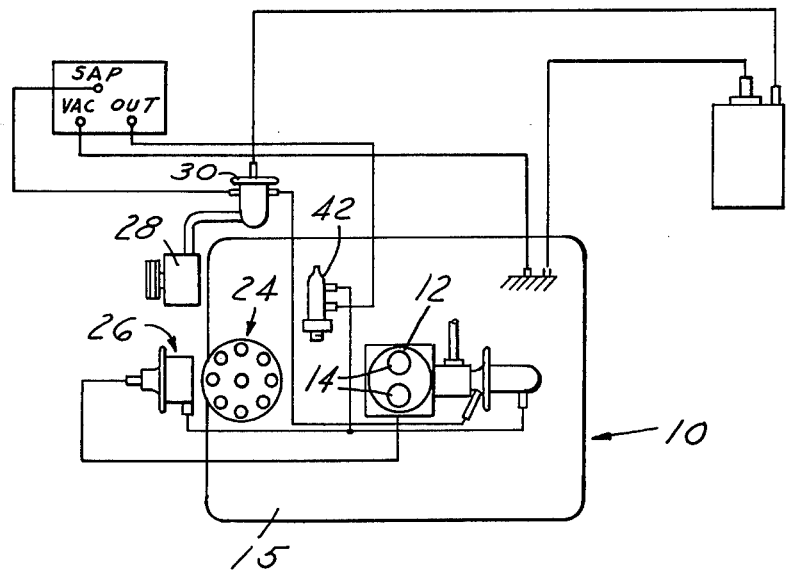

United States Patent [19]

Rodenkirch

[11] 4,124,006
[45] Nov. 7, 1978

[54] ENGINE EMISSION CONTROL SYSTEM

[75] Inventor: Norman E. Rodenkirch, Ann Arbor, Mich.

[73] Assignee: Ford Motor Company, Dearborn, Mich.

[21] Appl. No.: 813,713

[22] Filed: Jul. 7, 1977

[51] Int. Cl.² ............................................. F02M 25/06
[52] U.S. Cl. ............................ 123/119 A; 123/117 R; 123/117 A
[58] Field of Search ............ 123/119 A, 117 R, 117 A

[56] References Cited
U.S. PATENT DOCUMENTS

| 3,796,049 | 3/1974 | Hayashi | 123/119 A |
|---|---|---|---|
| 3,812,832 | 5/1974 | Scott | 123/119 A |
| 3,895,616 | 7/1975 | Steinke | 123/117 A |
| 3,935,843 | 2/1976 | Ludwig | 123/117 A |
| 3,938,329 | 2/1976 | Basshuysen | 123/117 A |
| 3,939,810 | 2/1976 | Walker | 123/117 A |
| 3,974,807 | 8/1976 | Nohira et al. | 123/119 A |
| 3,978,834 | 9/1976 | Arnaud et al. | 123/119 A |
| 4,040,401 | 8/1977 | Marsee | 123/119 A |

Primary Examiner—Wendell E. Burns
Attorney, Agent, or Firm—Robert E. McCollum; Keith L. Zerschling

[57] ABSTRACT

An automotive emission control system in which the engine timing is advanced an amount that is supplemental to the normal part throttle advance, in response to exhaust gas recirculation (EGR) flow, to compensate for the slower burning rate due to EGR dilution of the engine intake charge, the EGR flow being accomplished by an engine driven air pump pressure controlled by an air pump pressure modified by manifold vacuum so as to be speed and load responsive, the triggering pressure also being applied to the ignition timing distributor servo.

7 Claims, 4 Drawing Figures

ENGINE EMISSION CONTROL SYSTEM

This invention relates in general to a system for controlling emissions from an automotive type internal combustion engine. More particularly, it relates to one in which the engine ignition timing is advanced in proportion to the volume of recirculation of engine exhaust gases to provide efficient combustion.

Exhaust gas recirculation (EGR) is well known as a measure to control $NO_x$ levels. EGR dilutes the intake charge to reduce the peak combustion temperatures and pressures which cause $NO_x$. EGR, however, results in a slower burning rate. To compensate for this, the engine ignition timing should be advanced in proportion to the amount of EGR so that maximum power can be developed with the minimum fuel.

The primary object of this invention, therefore, is to provide a system for controlling emissions that recirculates the engine exhaust gases in accordance with a predetermined schedule and simultaneously advances the engine ignition timing to compensate for the slower burning rate of the mixture passing to the engine combustion chambers.

Systems are known for controlling $NO_x$ levels and simultaneously advancing ignition timing. U.S. Pat. No. 3,809,038, R. N. Young, Exhaust Pollution Control Apparatus, illustrates schematically in FIG. 2 an emission control system in which ported manifold vacuum from a carburetor passes through a control box both to the engine ignition timing servo and to a servo controlling an exhaust gas recirculation valve. U.S. Pat. No. 3,780,713, Julian, Vacuum Operated Spark Advance Device, shows another system in which the engine ignition timing is advanced simultaneous with the recirculation of exhaust gases by means of a carburetor ported manifold vacuum signal.

In both of the above cases, however, the use of vacuum as a control is undesirable. First, so many devices on a car are operated by vacuum, that its dependability as a source for actuating a control precisely is questionable. Also, the use of ported manifold vacuum to open an EGR valve and control ignition timing advance is contrary to the way that the engine should be operated. More particularly, the engine's ability to withstand the addition of EGR without misfire, which produces undesirable hydrocarbon emissions, increases with load. Therefore, the ideal schedule would be for a slowly increasing EGR rate as the load increases. However, with ported vacuum control of EGR, low loads (high vacuum) produce high EGR flow and a decreasing EGR rate as the load increases since the ported manifold vacuum is used to move the EGR valve to an open position.

An example of a control system in which ported manifold vacuum is not used as the actuator is shown in U.S. Pat. No. 3,796,049, Hayashi, Exhaust Gas Recirculation System for an Internal Combustion Engine. An engine driven air pump provides an output pressure that is modified by manifold vacuum the resultant being applied to open the EGR valve. However, in this case, while the air pump pressure varies with engine speed and, therefore, provides an EGR flow rate that is more proportional to the schedule the engine should follow, there is no advancement of the ignition timing in proportion to the EGR flow to compensate for the dilution of the intake charge by the EGR gases. Also, the EGR valve actuating force, being a reduced air pump pressure, may be inadequate at times to open the EGR valve.

Other examples of patent literature that are pertinent to a system of this type are U.S. Pat. No. 3,834,666, Kingsbury, and U.S. Pat. No. 3,756,210, Kuehl, respectively, each of which uses engine exhaust gas backpressure to control ported manifold vacuum acting on the EGR valve to open it. In this case, the triggering pressure is not load and speed responsive. U.S. Pat. No. 3,865,089, Eichler et al, and U.S. Pat. No. 3,895,616, Steinke, both show and describe engine ignition timing servos providing additional timing changes to compensate for cold engine operation to quickly warm catalytic converters or reactors, etc.

As pointed out above, each of the prior art devices has disadvantages in that no system is provided in which the EGR flow schedule varies in the desired manner as a function of engine speed and load and simultaneously the engine ignition timing is advanced to compensate for the lower burning rate due to dilution of the intake charge with EGR, and an adequate actuating force is provided that does not decay intermittently.

It is another object of the invention, therefore, to provide a system for controlling emissions that recirculates engine exhaust gases for controlling $NO_x$ levels while simultaneously the engine ignition timing is advanced in proportion to the amount of EGR, the EGR flow rate varying as a function of engine speed and load.

Figure 2:
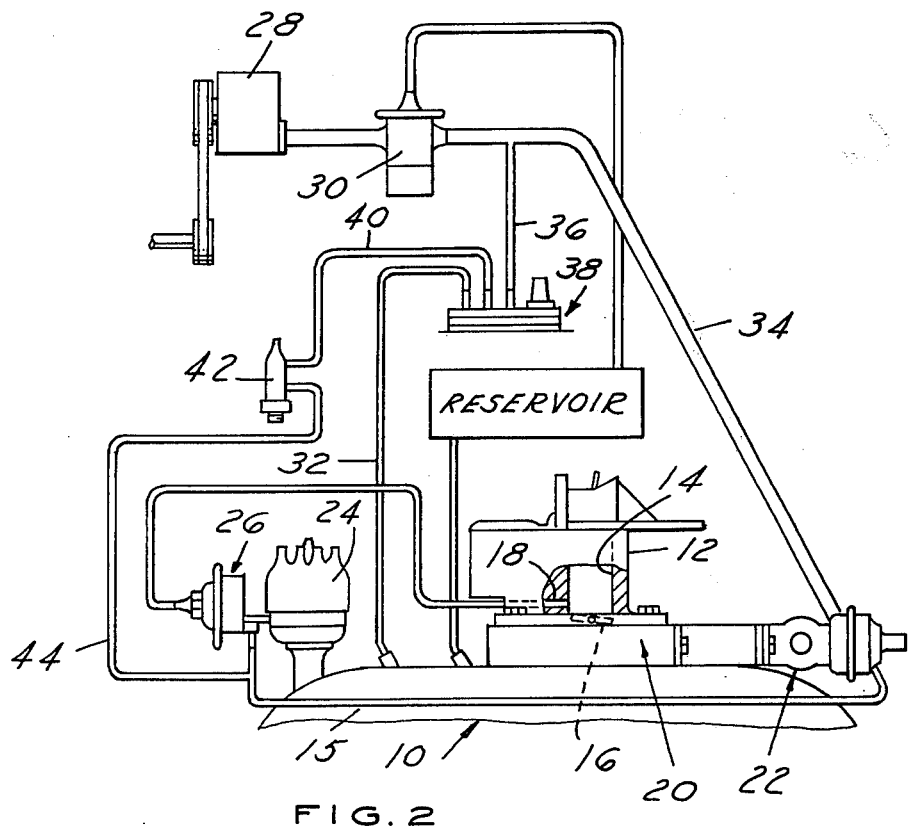
Figure 3:
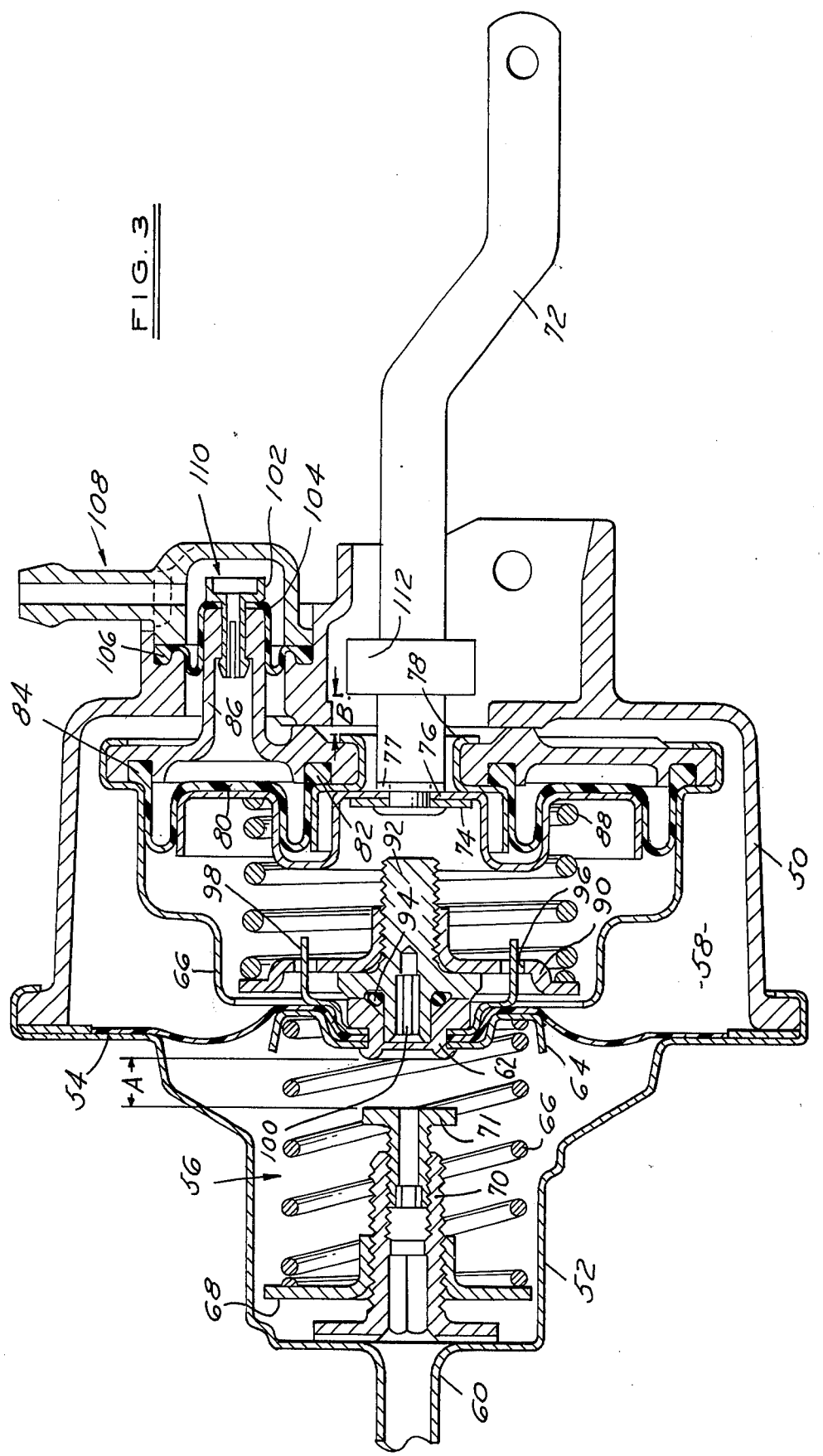
Figure 4:
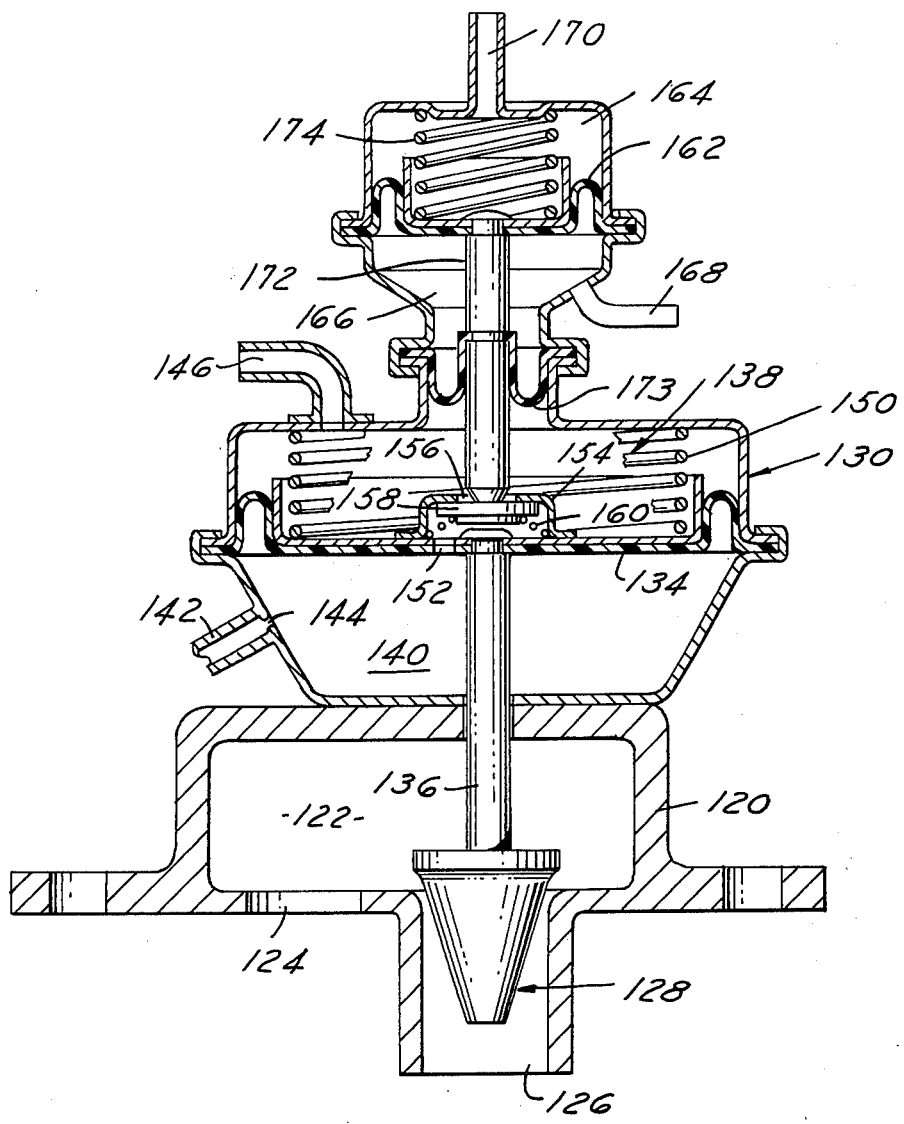

Other objects, features and advantages of the invention will become more apparent upon reference to the succeeding detailed description thereof, and to the drawings illustrating a preferred embodiment thereof; wherein, FIG. 1 schematically illustrates an emission control system constructed according to the invention;

FIG. 2 is a somewhat less schematic illustration similar to the showing in FIG. 1; and, FIGS. 3 and 4 are cross-sectional views on enlarged scales of details shown in FIGS. 1 and 2.

Illustrated schematically in FIGS. 1 and 2 is an automotive type internal combustion engine 10 on which is mounted a downdraft type carburetor 12. The carburetor has a pair of the usual induction passages 14 through which an air/fuel mixture is fed to the engine intake manifold 15 (FIG. 2) past a rotatable throttle valve 16. The edge of the throttle valve traverses a so-called spark port 18 as it moves from the essentially closed position of the valve towards a wide open position to apply the manifold vacuum acting below the throttle valve to the progressively increasing exposed area of the port. In the closed position of the throttle valve, the port 18 will be subjected to atmospheric or ambient pressure.

Mounted on the engine between the carburetor and intake manifold is a spacer 20 of the type shown and described more clearly in U.S. Pat. No. 3,885,538, Suter, assigned to the assignee of this invention. In brief, the spacer contains a passage connecting the exhaust gas crossover passage of the engine to the intake manifold below the carburetor induction passage riser bores to flow exhaust gases back into the engine according to a predetermined schedule. As best seen in FIG. 4, an EGR valve 22 is located in the passage to block or permit flow of EGR gases. This will be described in more detail later.

Also mounted on the engine is a conventional engine spark timing distributor mechanism 24 containing a conventional rotatable breaker plate (not shown). The breaker plate in this case is adapted to be actuated in opposite directions by a servo mechanism 26 illustrated schematically in FIGS. 1 and 2 and in more detail in FIG. 3. In brief, the servo mechanism 26 provides a stepped or multistage advance of the ignition timing in response to movement of the throttle valve, and additionally in proportion to the EGR, to control engine emissions. The particular details of construction and operation of the servo mechanism 26 will be described later.

Driven by the engine is an air pump 28 providing an output superatmospheric pressure level that varies as a function of engine speed. The air pump is commonly provided to control emissions by providing so-called secondary (secondary to engine primary intake) air to the engine exhaust ports to combine with unburned hydrocarbons and CO to reduce them to less desirable forms such as $H_2O$ and $CO_2$. Commonly associated with the air pump is a so-called dump valve 30 which essentially is an on/off valve that normally permits flow to the exhaust ports except under certain engine operating conditions.

In this case, dump valve 30 has a connection 32 to the engine intake manifold, as shown. The dump valve also has a plurality of outlets for the air pump pressure, one being a line 34 to the EGR valve to open it when the pressure level is correct, and another line 36 being directed to a so-called signal conditioner 38. The signal conditioner 38 also receives an input from the engine intake manifold through line 32. It operates to condition the input air pump pressure through line 36 as a function of the changes in manifold vacuum to provide an output pressure in a line 40 that varies both as a function of speed and load. This output pressure is supplied past a temperature sensitive control valve 42 through a line 44 to both the ignition timing control servo 26 and to the EGR valve servo 22. In this way, the EGR valve will be actuated according to a schedule that varies as a function of both engine speed and load. This simultaneously advances the engine ignition timing.

The temperature responsive device 42 is merely a gradient opening-closing control which, below a predetermined engine operating temperature level, blocks passage 44 to provide better engine drivability, and above that temperature level gradually opens so as to slowly permit the recirculation of exhaust gases and advancement of the ignition timing.

Further details of construction of the devices as shown in FIGS. 1 and 2, except for the ignition timing servo mechanism 26 and the EGR servo actuator 22, which are shown in more detail in FIGS. 3 and 4, are not given since they are known and believed to be unnecessary for an understanding of the invention. Suffice it to say insofar as signal conditioner 38 is concerned, this could be of several general types, one of which is shown and described, for example, in U.S. Pat. No. 3,885,538, referred to above. In that case, air pump pressure is modified by manifold vacuum acting on a diaphragm to provide a resultant pressure operable on an EGR valve. Similarly, U.S. Pat. No. 3,796,049, referred to above, shows an air pump pressure modified by changes in intake manifold vacuum to provide a modified output pressure in a line acting on an EGR valve. In both cases, the output superatmospheric pressure varies essentially in inverse proportion to increases in manifold vacuum.

FIG. 3 shows the details of construction of the multistage ignition timing control servo 26. More particularly, the servo consists of a main housing 50 and a bell shaped like cover 52 between which is edge mounted an annular flexible diaphragm 54. The diaphragm divides the servo into a spark port vacuum chamber 56 and an atmospheric pressure or ambient pressure chamber 58. The vacuum chamber 56 is connected by a nipple 60 to the carburetor part throttle spark port 18 shown in FIGS. 1 and 2. Diaphragm 54 is secured centrally by a rivet 62 between a spring retainer or washer 64 and the inner diameter of an inner housing 66. A spring 66 is seated at one end against the washer and at the other end against a spring retainer 68 that is adjustably threaded onto an adjusting screw 70. Screw 70 is floatingly mounted inside the cover 52. The adjusting screw has a central aperture within which is screwed a stop member 71 that locates the leftward movement or ignition timing advance movement of diaphragm 54.

The breaker plate for distributor 24 shown in FIGS. 1 and 2 has a lever 72 secured to it whereby advance or retard movement of the breaker plate will occur in a known manner when the lever moves in a leftward or rightward direction, respectively, as seen in FIG. 3. The leftward end of lever 72 is peened against a washer 74 abutting a retainer 76 and a spacer 77. In the position shown, the retainer 76 also abuts a retainer 78 for a secondary annular flexible diaphragm 80 that provides the additional advance proportional to EGR flow described previously. The diaphragm 80 is washer-like having inner and outer annular edges 82 and 84. The inner edge is sandwiched between the retainer 78 and the inner diameter of a washer-like rigid housing 86. The outer edge of the diaphragm 80 is sandwiched between the outer diameter of the housing 86 and the outer portion of the inner cover 66.

The diaphragm 80 is normally biased rightwardly as shown in FIG. 3 by a spring 88 that seats at one end against the retainer 76 and at the opposite end against a retainer 90. The retainer 90 is threaded onto a screw device 92 that fits into the pilot hole of rivet 62 with an O-ring seal member 94 between. The retainer 90 has a number of circumferentially spaced holes 96 through which tangs 98 project to prevent rotation of the retainer with respect to the screw 92. The tangs 98 are punched out of the inner housing cover 66. The opposite end of screw 92 has a hexagonally shaped hole 100 to permit the entry of an allen head type wrench. Rotation of the wrench will cause a rightward or leftward movement of retainer 90 to preload the spring 88. The preloaded spring biases the secondary diaphragm 80 rightwardly until the retainer 76 abuts the retainer 78 and the housing 86 against the stationary housing 50.

Completing the construction, the modified air pump pressure or pressure from the signal conditioner 38 shown in FIGS. 1 and 2 is supplied to the housing to act against the secondary diaphragm 80 through a nylon adaptor 102. The latter is pushed through an opening in the housing 86 and secures a rolling seal member 104 to the housing. The outer end of the rolling seal 106 is clamped to the housing by an additional cover 108 containing a nipple connected to the signal pressure line 44. The rolling seal together with the cover 108 form an air pressure chamber 110.

In operation, as shown, the lever 72 is shown in a maximum engine ignition retard position. The part throttle advance spring 66 locates the part throttle diaphragm 54 as shown pushing the inner cover 66 and housing 86 against the stationary housing 50. At the same time, the inner spring 88 pushes the retainer 76 against the retainer 74. No air pressure is present in chamber 110.

With the engine started, depression of the throttle pedal provides part throttle vacuum from the spark port 18 to the nipple 60 to vacuum chamber 56 to act on diaphragm 54. Once the preload of spring 66 is overcome, diaphragm 54 will move leftwardly pulling the housings 66 and 86 in the same direction. Housing 86 therefore moves inner retainer 78 and retainer 76 leftwardly to move the lever 72 in the same direction. This will continue as long as the part throttle spark port vacuum increases until the rivet 62 abuts against the adjustable stop 71. At this time, the part throttle advance will be halted.

In addition to the above advance movement, as soon as the modified air pump pressure from the signal conditioner flowing to the EGR valve is sufficient to trigger the EGR valve to open, this same pressure through the cover 108 will act on the secondary diaphragm 80 pushing retainer 76 against the resistance of spring 88. Assuming that the preload of spring 88 is overcome at the same time the EGR valve opens, the secondary diaphragm 80 moves leftwardly to move retainer 76 and thus move lever 72 in the advance direction an amount that is additional to that already provided by the part throttle advance. The amount or distance travelled will be limited by an abutment 112 on lever 72 that abuts the rolled over end of retainer 78 to stop the advance movement.

Thus, the distributor actuator servo will provide a conventional part throttle vacuum advance, indicated as a distance "A" in FIG. 3, and an additional advance distance "B" proportional to the EGR flow. Ignition timing thus will be advanced as EGR flow occurs to compensate for the slower burning rate of the mixture as the result of adding exhaust gases to the engine intake charge.

FIG. 4 illustrates the details of construction of one form of an EGR valve that can be used with the invention. More specifically, the EGR valve assembly includes a housing 120 that is bolted to the spacer 20 between the carburetor and engine intake manifold shown in FIGS. 1 and 2. The housing is hollow to define a chamber 122 having an inlet 124 and an outlet 126. Inlet 124 is connected to the engine exhaust gas crossover passage described previously to flow exhaust gases into the chamber. Passage 126 is connected to the engine intake manifold below the carburetor throttle riser bores, as also described previously. Passage 126 at its upper end is adapted to be closed by a vertically movable valve pintle 128 that, in this case, constitutes the plug of a sonic nozzle. The latter is shown and fully described in U.S. Pat. No. 3,981,283, Kaufman, assigned to the assignee of this invention. In brief, the pintle 128 and nozzle outlet 126 are so designed and proportioned as to maintain sonic flow to the gases flowing between the two over essentially the entire EGR operating range of the engine.

Secured over the housing 120 is the housing 130 of the exhaust gas recirculating (EGR) servo mechanism 22. The lower portion of the housing defines an EGR positioner or first servo mechanism. An annular flexible diaphragm 134 is edge mounted in the housing and secured to the stem 136 of the EGR valve pintle 128. Diaphragm 134 divides the housing into an atmospheric air chamber 138 and a variable air pressure chamber 140. Chamber 140 is connected by an adapter 142 through an orifice or controlled opening 144 to the air pump pressure line 34 illustrated in FIGS. 1 and 2. The air chamber 138 is connected to atmosphere or ambient pressure by means of a vent line 146. A spring 150 normally biases the diaphragm 134 and EGR valve to a closed position.

The diaphragm 134 is provided with a hole 152 to provide communication between the pressure chamber 140 and the air chamber 138. Overlying the end of valve stem 136 and the hole 152 is a hat shaped member 154 with a hole 156. Normally closing the hole is a flat disc valve 158 that is biased by a spring 160 upwardly as shown to seat against the hole 156. The parts just described define an air bleed device for controlling the positioning of the EGR valve by decaying the air pump pressure used as the force to move the valve to an open position.

The upper portion of the servo housing defines a pilot servo or EGR valve position regulator. A second annular flexible diaphragm 162 divides the upper portion of the housing into again an atmospheric pressure chamber 164 and a variable pressure chamber 166. In this chamber 166 is connected by a tube 168 to the signal pressure line 44 leading from the signal conditioner 38 shown in FIGS. 1 and 2 so as to be responsive to engine speed and load conditions. The air chamber 164 is connected to atmosphere by a tube 170. The diaphragm 162 is secured to the upper end of an actuating stem or plunger 172 that is secured to a rolling seal 173 and extends downwardly to abut the bleed valve disc 158. The rolling seal separates the air chamber 138 and variable pressure chamber 166.

A spring 174 normally biases the diaphragm 162 and plunger 172 downwardly to a position where the bleed valve 158 is unseated from the opening 156. This permits air at atmospheric pressure to bleed the air pump pressure from chamber 140 to a value below that necessary to actuate the EGR valve against the force of spring 150. It should be noted that the area of hole 152 is larger than that of the supply opening 144 so that the bleed valve, when open, can decay the air pump pressure below the necessary level. It should also be noted that the sizing of the diaphragms and other parts will be such that the EGR valve 128 when actuated will maintain a fixed position regardless of the force unbalance across the valve 128 because of the exhaust gas pressure and manifold vacuum acting on the pintle.

In operation, as soon as the signal pressure from the signal conditioner rises sufficiently to move the diaphragm 162 against the preload of spring 174, the plunger 172 will move upwardly and permit the disc valve 158 to seat against the opening 156, thereby sealing chamber 140 from communication with the atmospheric air in chamber 138. A buildup in air pump pressure will then occur until the force of spring 150 is overcome. The EGR valve 128 will then move upwardly to a position dependent upon the force of the air pump pressure. As the valve moves upwardly, the diaphragm 134 will move to a position until disc valve 158 engages the end of the plunger 172 to unseat the valve and again begin bleeding the air pump pressure to atmosphere. This will stop movement of the diaphragm 134. Continued decay of the pressure will permit the spring 150 to begin moving it downwardly again until the disc valve is again seated. This back and forth action will continue until an equilibrium position is reached whereby the position of the pintle 128 is dictated by the initial movement of the plunger 172 will be attained.

In overall operation, in brief, with the engine off, atmospheric pressure exists in the spark port vacuum line 60 leading to the multi-staged distributor servo 26, and also in the air pressure line leading to the second diaphragm chamber 110. Accordingly, the springs 66 and 88 position the distributor breaker plate lever 72 in its rightwardmost position or the maximum ignition timing retard position. Atmospheric pressure also exists in the EGR servo 22 permitting the spring 150 to seat and close the sonic EGR valve 128, and the spring 174 to move plunger 172 to unseat the disc valve 158. Therefore, no EGR flow occurs.

Once the engine is started, at engine idle, the same conditions prevail as described above since the low air pump pressure in chamber 110 is chosen to be insufficient to overcome the preload of spring 88 in the servo 26 and the preload of spring 174 in EGR valve. As soon as the throttle valve 16 is moved to an open position subjecting spark port 18 to vacuum, and once the preload of servo spring 66 is overcome, spark port vacuum in line 60 will act on diaphragm 54 to pull it leftwardly. This will move the inner housing cover 66 in the same direction and through the housing 86 and retainer 78 move the retainer 76 and breaker plate lever 72 in the same direction to slowly advance the engine ignition timing. Also, as the throttle plate is moved to an open position placing the engine under load, the increase in the air pump pressure to the signal conditioner 38, coupled with the decrease in manifold vacuum level, sends a modified signal pressure to the EGR position regulator servo to move its diaphragm 162 upwardly. This moves the plunger 172 in the same direction and allows the bleed valve 158 to be seated by the spring 160 against the opening 156 to seal off the chamber 140. The air pump pressure supplied to chamber 140 then builds up and when it is sufficient to overcome the preload of spring 150 begins moving the EGR valve 128 upwardly in proportion to the level of the signal pressure in line 44.

Simultaneously, the signal pressure in chamber 110 of the distributor servo 26 acts on the secondary diaphragm 80 to push the same leftwardly moving the retainer 76 and the breaker plate lever 72 in the same direction. An advance that is additional to the part throttle advance is thus imparted to the breaker plate to compensate for the addition of EGR to the system to thereby provide better combustion efficiency.

The above conditions continue with the EGR flow varying in proportion to the load until a wide open throttle (WOT) position is attained. At this point, a cut-off device (not shown) in the signal conditioner will be activated at a predetermined low manifold vacuum level so that no EGR will flow under these conditions. This is necessary because at WOT maximum power is only obtained by the maximum utilization of the total air available.

From the foregoing, it will be seen that the invention provides an emission control system that simultaneously controls EGR and ignition timing advance to provide efficient control of emissions while at the same time providing good engine operation.

While the invention has been shown and described in its preferred embodiments, it will be clear to those skilled in the arts to which it pertains that many changes and modifications may be made thereto without departing from the scope of the invention.

What I claim is:

1. An emission control system for an internal combustion engine having intake and exhaust manifolding, a carburetor mounted on the engine and having a throttle valve controlled air/fuel mixture induction passage, the passage being open at one end to air essentially at atmospheric pressure and connected at its opposite end to the engine intake manifold, a pressure sensing port in the passage adapted to be traversed by the edge of the throttle valve as the valve moves from an idle speed closed throttle position to an open throttle position whereby the port pressure varies progressively from an essentially atmospheric pressure level to the subatmospheric pressure level of the intake manifold, the system including an air pump driven by the engine providing a source of superatmospheric pressure varying as a function of engine speed, means for modifying the air pump pressure as a function of changes in engine manifold vacuum to provide a signal pressure that varies as a function of both engine speed and load, an engine ignition timing distributor breaker plate movable in opposite directions to operably advance and retard the engine ignition timing, multi-stage servo means connected to the breaker plate to move the same, an exhaust gas recirculating (EGR) system including a first conduit connecting exhaust gases to the intake manifold, an (EGR) valve in the conduit movable between a closed and open position to control flow through the conduit, second servo means connected to the (EGR) valve for moving the same between the open and closed positions, first conduit means operatively connecting the carburetor induction passage pressure port to a first part of the distributor multi-stage servo to effect a first stage part throttle movement of the same in an advance direction to provide part throttle ignition timing advance as a function of increases in the port vacuum level, second conduit means operatively connecting the air pump pressure to the (EGR) second servo means to actuate the (EGR) valve at times to an open position to permit the flow of exhaust gases to the manifold as a function of the level of the air pump pressure, control means operatively connected both to a second part of the multi-stage servo and to the second servo means for simultaneously controlling a second stage supplemental movement of the distributor multi-stage servo in an advance direction and the operativeness of the second servo means, and further conduit means connecting the signal pressure to the control means to control the actuation of the servo in timed relation to the actuation of the (EGR) valve by the air pump pressure.

2. A system as in claim 1, the second servo means including means operable below a predetermined signal pressure level to render the air pump pressure in the second conduit means ineffective to move the (EGR) valve and operative above the predetermined level to effect variable movement of the (EGR) valve.

3. A system as in claim 1, the second servo means including a normally open air bleed device in the second conduit means for decaying the air pump pressure, a spring biasing the (EGR) valve to a closed position, and other means actuated by the signal pressure for closing the bleed device to permit actuation of the (EGR) valve to an open position by the air pump pressure.

4. A system as in claim 1, the means for modifying the air pump pressure comprising a pressure reducer having a first input connected to the air pump pressure and a secone input connected to the manifold vacuum for reducing the air pump pressure as a function of increases in manifold vacuum level to provide in an outlet the output signal pressure that varies in inverse proportion to increases in manifold vacuum level.

5. A system as in claim 1, the multi-stage servo first part including a diaphragm connected to the breaker plate and actuated by pressure port vacuum a first distance in a first direction, and a second diaphragm operatively connected to the breaker plate for superimposing an additional movement of the breaker plate in the same direction as a function of (EGR) flow.

6. A system as in claim 1, including on-off temperature responsive valve means in the further conduit means movable to an off position below the engine normal operating temperature level to block flow of signal pressure to the control means to maintain a less advanced ignition timing without (EGR) flow during cold engine operating conditions.

7. An emission control system for an internal combustion engine having intake and exhaust manifolding, comprising an air pump driven by the engine providing a source of air at superatmospheric pressure, a carburetor mounted on the engine and having an air/fuel induction passage open at one end to a source of fresh air and connected at its opposite end to the intake manifold of the engine, a throttle valve mounted for movement across the passage to control flow therethrough, the passage having a spark timing pressure sensing port located to be traversed by the edge of the throttle valve when the throttle valve moves from an essentially closed idle speed position to an open position beyond the port whereby the spark port pressure varies progressively from an essentially atmospheric pressure level to the subatmospheric pressure level of the intake manifold, a distributor breaker plate movable in opposite directions between maximum and minimum positions to operably advance or retard the engine spark timing, a conduit connecting exhaust gases from the exhaust manifolding to the intake manifold, an exhaust gas recirculating (EGR) valve in the conduit variably movable between closed and open positions to control the flow of (EGR) gases, second conduit means at times connecting a source of superatmospheric pressure to the (EGR) valve to actuate the same to an open position, and multistage vacuum servo means operably connected to the breaker plate for moving the same between its positions in response to the change in the level of the pressure in the pressure sensing port and in the second conduit means acting on the servo means.

* * * * *